United States Patent
Schneider (10) Patent No.: US 11,376,650 B2
(45) Date of Patent: Jul. 5, 2022

(54) METHOD FOR PRODUCING TRIM STRIPS AND TRIM STRIPS PRODUCED USING SAID METHOD

(71) Applicant: ADVAL TECH HOLDING AG, Niederwangen (CH)

(72) Inventor: Eckhard Schneider, Sasbach-Leiselheim (DE)

(73) Assignee: ADVAL TECH HOLDING AG, Niederwangen (CH)

( * ) Notice: Subject to any disclaimer, the term of this patent is extended or adjusted under 35 U.S.C. 154(b) by 535 days.

(21) Appl. No.: 16/314,613

(22) PCT Filed: Jun. 8, 2017

(86) PCT No.: PCT/EP2017/063897
§ 371 (c)(1),
(2) Date: Dec. 31, 2018

(87) PCT Pub. No.: WO2018/001692
PCT Pub. Date: Jan. 4, 2018

(65) Prior Publication Data
US 2019/0151930 A1    May 23, 2019

(30) Foreign Application Priority Data
Jul. 1, 2016   (CH) .................................... 00839/16

(51) Int. Cl.
*B21D 53/88*    (2006.01)
*B21D 5/04*    (2006.01)
*B60R 13/04*    (2006.01)

(52) U.S. Cl.
CPC .............. *B21D 53/88* (2013.01); *B21D 5/04* (2013.01); *B60R 13/04* (2013.01)

(58) Field of Classification Search
CPC ... B21D 5/01; B21D 5/04; B21D 5/06; B21D 11/20; B21D 19/08; B21D 37/08; B21D 53/88
See application file for complete search history.

(56) References Cited

U.S. PATENT DOCUMENTS 6,748,788 B2 *  6/2004  Yamano ................... B21D 5/01
                                                       72/306
2014/0047889 A1  2/2014  Golovashchenko

FOREIGN PATENT DOCUMENTS

DE    10 2010 017 996 A1   11/2010
DE    10 2014 108 726 A1   12/2015
JP         59-94529 A       5/1984

OTHER PUBLICATIONS

International Search Report of PCT/EP2017/063897 dated Sep. 13, 2017.

* cited by examiner

*Primary Examiner* — Teresa M Ekiert
(74) *Attorney, Agent, or Firm* — Sughrue Mion, PLLC (57) ABSTRACT

A method for producing a trim strip comprising an extended portion (20) and a bent portion (19) which has a sharp edge (21) comprising the following steps: i) providing a blank with a material thickness and a shaped end cap contour (27); ii) bending the cap contour (27); iii) forming a sharp edge (21) along the bent portion (19), wherein a punch (31) for the edge-forming process, comprising a side surface (33, 37) which is stepped so as to correspond substantially to the material thickness and which faces the die (30) and counter die (32), is guided along the side surfaces (52, 35) of the counter die (32) and die (30) such that the step (34) of the punch (31) engages with the marginal edge (56) and displaces the material of the folded portion (19) towards the edge portion (21), thereby forming a sharp edge.

22 Claims, 4 Drawing Sheets

METHOD FOR PRODUCING TRIM STRIPS AND TRIM STRIPS PRODUCED USING SAID METHOD

CROSS REFERENCE TO RELATED APPLICATIONS

This application is a National Stage of International Application No. PCT/EP2017/063897 filed Jun. 8, 2017, claiming priority based on Swiss Patent Application No. 00839/16 filed Jul. 1, 2016.

TECHNICAL FIELD

The present invention relates to a method for producing specifically shaped trim strips, in particular for use in the automotive sector, and trim strips produced using the method.

PRIOR ART

So called "trim strips" of metal are used at various locations in the vehicle in different embodiments They may comprise plastics material or metal and serve to optimize transition regions from different portions both from an aesthetic viewpoint and from a technical viewpoint (sealing, protection from penetration of dirt, aerodynamic configuration). Such trim strips bridge, for example, in a door of a vehicle, the region between the actual metal bodywork and window, and can be constructed as an extruded profile or us a sheet portion which correspondingly cut and shaped.

In particular, the end portions in which corresponding regions between movable portions have to be provided in an adapted state are important with such trim ships. That is to say, the transitions are important in which the substantially adjacent horizontally extending trim strips are intended to be constructed at the vertically extending edges of the doors. The corresponding sheet at this location cannot be cut in a simple manner, but instead at these locations either end flaps have to be arranged or the corresponding sheet portion has to be bent over. In this instance, comparatively large bending radii are generally produced, which disadvantageous for the desired gap dimensions in the automotive sector both from on aesthetic and from a technical viewpoint. In these regions, if a low gap dimension is required, a high level of precision is additionally required. This is the case since, for example, with pivoting doors, the bent-over region has to be adapted in an optimum manner, thus, for example, at the opening side of a door, the angle between the main extent direction of the trim ship and the bent-over region with a horizontally extending trim strip does not necessarily need to be formed as a right angle and the corresponding angle of the him strip arranged on the stationary bodywork portion has to be constructed in a precisely adapted manner.

DE-A-102014108726 discloses a method for producing a functional or trim strip, wherein the strip produced comprises a longitudinally extending portion and at least one bent end portion. The method serves in particular to shape the snip end by after the strip has been bent in a subsequent method step in the bending region of the strip, a displacement of plastically deformable metal material being carried out, whereby small outer radius between the end portion and the longitudinally extending portion is achieved. In this instance, the procedure is such that, after the actual turning-over of the edge by means of a stamp which engages from the inner side into the hollow of the turned-over region, the material in the bent-over region is displaced outward in order to obtain a narrower radius at the outer side.

STATEMENT OF INVENTION

An object of the present invention is inter alia accordingly to provide an improved method for producing a trim strip, in particular for producing a trim strip res the automotive doctor. The present invention accordingly relates to a method for producing a trim stop, wherein this trim strip has in the extent direction thereof a length L which is at least twice as large as the width B thereof perpendicularly to the extent direction. The trim strip additionally has an extension portion along the length thereof and at least at one end a portion which is turned over with respect to the extent direction about an angle $\alpha$ in the range from 60-120° with a sharp edge. This turned-over portion replaces an end tap as illustrated above, and the specific feature of this turned-over portion is the sharp edge thereof, that is to say, a transition region with a low radius between the outer face of the turned-over portion and the outer surface of the extension portion. The angle between the extension portion and this turned-over portion may be an acute angle ($\alpha$ in the range of less than 90°), but it so ay also be an obtuse angle, depending on the application and field of use.

The method proposed comprises at least the following steps:

i) presenting a plate with a material thickness (Mat) and with a prepared contour (preferably a reserved cut end cap contour, that is to say, which is suitable and in this instance above all takes into account the back-compression but also rebound, etcetera), for the formation of the portion;

ii) turning over the prepared contour in a bending operation.
   wherein the plate in the region of the future extension portion at least in the end region is clamped between a die and a holding-down member and the prepared contour is bent over by means of the displacement of a stamp to form a turned-over portion with a peripheral edge;

iii) forming a sharp edge of the turned-over portion,
   wherein as least in the end region of the extension portion a counter-mold is clamped between a first clamping face of a die for the edge transition operation and a second clamping face.
      wherein the inner face of the turned-over portion is in abutment with a planar or curved side face of the counter-mold,
      wherein a corresponding side face of the die for the edge formation operation protrudes further in the extent direction substantially by the material thickness (Mat) than the side face of the counter-mold, and wherein the first clamping face of the die in continued in the overhanging region by the maternal thickness in the extent direction with a sharp edge being formed with respect to the side face,
   and wherein a stamp for the edge formation operation is guided with a side face (facing the die and counter-mold) which is stepped substantially by the material thickness in such a manner along the side faces of the counter-mold and die that the step in the side face of the stamp engages on the peripheral edge and displaces the material of the turned-over portion into the edge region with a sharp edge being formed.

According to a first preferred embodiment the method is characterized in that the peripheral edge is cut between the step ii) and the step iii) in a punching operation and/or a cutting operation or is processed in a calling manner. In this instance, the plate which is presented in step i) can be produced in a punching operation and and/or cutting operation, including laser cutting, from a flat sheet metal ship, and preferably holes can be provided. Before step if the plate can additionally be folded and/or curved about an axis which extends substantially parallel with the extent direction with a bent-over portion or a folded portion being formed. Alternatively, it is possible for the plate presented in step i) to be presented or produced from an extruded profile, wherein preferably any edge profile ribs which may be present in the region adjacent to the turned-over portion are preferably cut out in advance and the reserved end cap contour is cut or stamped from the profile which has often already been carved parallel with the extent direction.

Another preferred embodiment is characterized in that in step ii) the turned-over portion is turned over about an axis perpendicular to the extant direction.

Following step iii), according to another preferred embodiment the trim strip may be subjected to another processing step. For example, such additional operations may involve the following: cutting, surface treatment, including, surface coating, polishing, anodization, honing, cutting surface treatment, etcetera.

Following step iii), the sharp edge of the trim strip may be further refined in a subsequent embossing step. For example by the sharp edge being polished and/or ground or, however, particularly preferably by the extension portion of the trim strip at least in the end region being clamped between a first clamping face of a die for the radius embossing and a second clamping face of a holding-down member for the radius embossing, the peripheral edge of the turned-over portion is supported in a step of a side face of the die for the radius embossing and from the side of the holding-down member a stamp for the radius embossing with a rounded step for the desired radium for the sharp edge guided in a shaping manner or the sharp edge.

The trim strip preferably consists of metal, preferably aluminum or an aluminum alloy (for example, Al99.9Mgl; Al99.7Mg0.8Cu), of steel, preferably stainless steel, brass, silver, titanium, copper, or an alloy of these materials.

The trim strip preferably has a material thickness in Use range from 0.5-2.5 mm, preferably in the range from 0.8-2 mm, in particular in the range from 1-1.6 mm.

In a particularly preferred manner, the trim strips are produced from semi-finished products with a wall thickness between 5.0 mm and 1.6 mm, preferably from aluminum alloys. However, the production of trim strips from stainless steels (for example, 1.4301, 1.4303, 1.4310, 1.4016) or from black steel (for example, DC01, DC02, DC03, DC04, DC05, DC06, HC220, HC300, HC340, HC420) which is subsequently coated is possible or has already been carried out. Furthermore, the production of such trim strips from additional metal materials with adequate shaping capacity is possible (for example, brass, silver, titanium, copper).

The sharp edge preferably has a radius of a maximum of 2.0 mm, preferably in the range bono 0.1-2.0 mm, particularly preferably in the range from 0.2-1 mm. Even sharp edges with very small radii of less than 0.1 mm or even 0.0 mm are possible.

With a specific starting material thickness, preferably in the range from 0.5-2.5 mm, particularly preferably in the range from 0.8-2 mm, or in the range from 1-1.6 mm, the sharp edge preferably has a radius of 0.1-0.4 times the starting material thickness, preferably 0.2-0.3 times the starting material thickness.

The length (L) of the trim strip is particularly preferably in the range from 5-300 cm, preferably 10-150 cm, preferably in the range from 20-100 cm.

The width (B) of the trim strip it; preferably in the range from 0.4-12 cm, preferably in the range from 1-5 or 1-3 cm.

The length (l) of the turned-over portion at the longest location is preferably in the range front 0.3-5 cm, preferably in the range from 0.5-3 cm.

The present invention further relates to a trim strip, preferably produced with a method as set out above, characterized in that the trim strip in the extent direction thereof has a length, (L) which is at least twice as large as the width B thereof perpendicularly to the extent direction, with an extension portion and at least at one end a portion which is turned over with respect to the extent direction about an angle α in the range from 60-120° with a sharp edge, wherein the trim strip consists of metal or at least in the region of the turned-over portion consists of metal, and wherein the sharp edge has an (outer) radius of a maximum of 2.0 mm, preferably in the range from 0.1-10 mm, particularly preferably in the range from 0.2-1 mm.

In connection with such a trim strip, the following should be emphasized, a trim strip which has been produced in accordance with the proposed method differs from a trim strip as can be obtained in accordance with the method in DE-A-10 2014 108726 mentioned in the introduction. This is for the following reasons:

The achievable dimensions of the corner radius are in the method of DE-A-10 2014 108726 substantially more limited than in this case, in DE-A-10 2014 108726 it is expressly mentioned in claim 10 that the outer radius corresponds to an inner radius, which can be achieved during bending. The radius during bending may not be smaller than the material thickness, with aluminum it is often even the case that— depending on the alloy—a factor of 1.5 or 2 has to be taken. This means in addition that there, can be produced with the method according to DE-A-10 2014 108726 no trim strips which have an outer radius which is smaller than the material thickness which the example on page 3 (paragraph 0016) also proves (1 mm wall thickness, 1.4 mm outer radius). This is different in the method proposed in this instance since in this instance outer radii which are significantly smaller than the material thickness (see also FIG. 5) can be achieved.

As a result of the method according to DE-A-10 2014 108726, the material in the region of the outer edge is further thinned since the shaping is canned out using a "stretching", that is to say, the material for filling the outer contour is "obtained" by means of a "tapering" of the material thickness, in the method suggested in this instance, in contrast, material is supplied to the radius region by means of a reduction of the face (companion), which leads to an increase of the material thickness in this region.

Figure 2A:
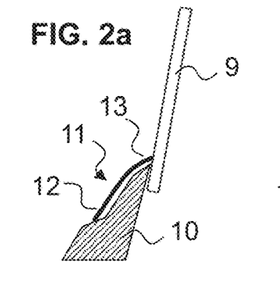
FIGS. 2a-2c show sectioned illustrations through trim strips perpendicularly to the main extent direction of the trim strip in the transition region from the chassis to a glass pane in a door, wherein a) shows a trim strip with a curved profile and b) shows a planar trim strip and c) shows a trim strip in the form of an angled sheet.
Figure 2B:
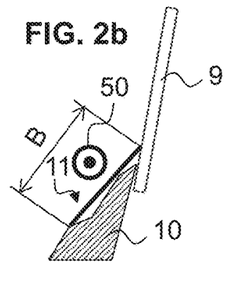
Figure 2C:
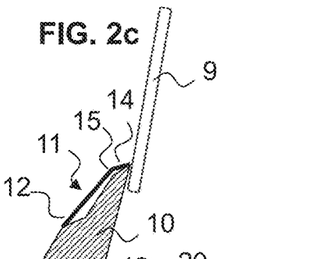

Another effect of such a "stretching process" in accordance with DE-A-10 2014 108726 is a worsening of the surface in the radius region. In FIGS. 2a-2c a trim strip is illustrated after the "bending". In the region of the outer radius, a roughening of the surface can be seen here. (at the outer side, the material is expanded by the bending operation). This effect is even further reinforced by a stretching operation (extension of the material) in accordance with DE-A-10 2014 108726.

It can thus in summary be determined that there can be produced with the method proposed in this instance trim strips winch differ from those according to DE-A-10 2014 108726 with respect to the following features:

size of the outer radius,
material thickness in the radius region,
surface quality in this region.

Thus, in accordance with the method according to DE-A-10 2014 108726, minimum outer radii are limited to 0.5× starting material thickness (that is to say, approximately 0.5 mm with 1 mm sheet thickness).

In accordance with the method proposed in this instance, however, it is possible tor significantly deeper minimal outer radii of up to 0.1× starting material thickness to be achieved. Accordingly, the present invention according to a preferred embodiment relates to a trim strip, preferably produced in a method as illustrated above, characterized in that the trim strip of metal with a starting material thickness M has an (outer) radius R, which is in the range front 0.1-0.4 tunes the starting material thickness (R in the range from 0.1×M-0.4× M), preferably in the range from 0.2-0.3× starting material thickness. It is thus possible to have, for example, approximately an outer radius of 0.2 mm with a sheet thickness of 1 mm.

Such a trim strip is preferably produced in a non-cutting manner.

Last and not least, the present invention relates to the use of such a trim strip in the automotive sector, in particular in the outer region of automobiles.

Other embodiments are set out in the dependent claims.

BRIEF DESCRIPTION OF THE DRAWINGS

Preferred embodiments of the invention are described below with reference to the drawings which serve merely as an explanation and are not intended to be interpreted in a limiting manner. In the drawings:

FIGS. 6a-6f show different method steps in the production of a turned-over edge portion, wherein in a) the planar cut blank (plate) is illustrated at the left side in a plan view and at the right side in a perspective view;

b) the intermediate step which is formed in the edge region in a curved manner is illustrated at the left side in a plan view and at the right side in a perspective view;

c) the tool for turning over the region 19 is illustrated at the left side and the trim strip which is produced therewith is illustrated at the right side in a perspective view;

d) at the left side it is schematically illustrated how the turned-over region can be cut;

e) the tool for forming the sharp edge is illustrated at the left side and the trim strip which is produced therewith is illustrated at the right side in a perspective view;

f) the tool for additionally embossing the produced edge is illustrated at the left side.

DESCRIPTION OF PREFERRED EMBODIMENTS

Figure 1A:
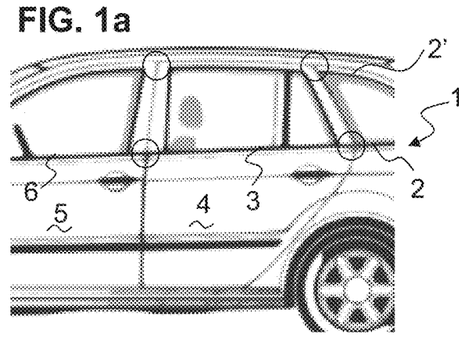
FIGS. 1a and 1b show different critical locations in trim strips in an automobile as a schematic side view in a) and as a rear view in b)
Figure 1B:
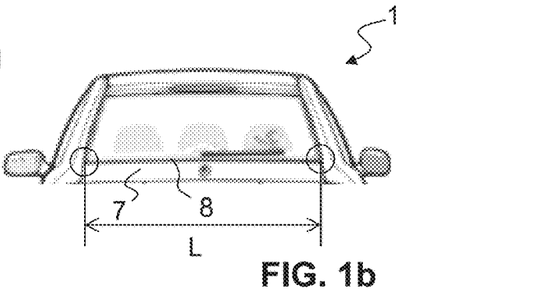

FIGS. 1a and 1b illustrate possible fields of use of a trim strip 11 according to the invention in a vehicle 1. It can be seen that the trim strips do not have to be straight, but instead correspond to the contour of the region which is intended to be decorated (for example, window). Of particular interest are in this instance the regions indicated with circles. Thus, in particular the region in FIG. 1a, a side view, where the lower trim strip 6 on the front door 5 adjoins the lower trim strip 3 on the rear door 4. In order in this instance to achieve a small gap dimension with sharp edges, a turned-over region 19 must have a high level of precision. Similar regions are designated in the roof region, and also in the rear region such trim strips are frequently provided as lower trim strips 2 and upper trim strips 2' on the stationary region. wherein they may be constructed as individual pieces or also as at least partially peripheral coherent frame portions (for example, a coherent "U"). In this instance, the transition between the moved door 4 and the stationary region is also decisive. Similar critical regions are produced in the rear region, in the tailgate, as illustrated in FIG. 1b. Such trim strips, in this instance the lower trim strip 8 on the tailgate 7, may have a considerable length L, a trim strip generally has a larger length L than the width thereof perpendicularly to this main extent direction thereof.

With the trim strips 11 reference is made to different possible profiles in a sectioned illustration perpendicular to the main extent direction 50. The most frequently used profile possibilities are schematically illustrated in FIGS. 2a-2c. Such a trim strip 11 generally bridges, for example, in a situation as illustrated with the reference numeral 3 in FIG. 1a the transition from a bodywork substructure 10 to a glass pane 9. The trim strip 11 bridges this edge region and covers in this instance functional components which are arranged in this edge region at least partially, such as, for example, seals, sealing lips, etcetera.

A first possibility is illustrated in FIG. 2a, in tins instance the trim strip 11 is constructed to be planar in a first region 12, and then merges into a curved region 13. It is also possible that these is no planar region 12 at all and the entire trim strip 11 is curved in a step perpendicular to the main extent direction 50. It is also possible, as illustrated in FIG. 2b, for such a trim strip to be completely planar in a sectioned illustration, and it is further possible for the trim strip, as illustrated in FIG. 2c, to have a first planar region 12, which merges via a bend 15 into a second planar region 14 (so-called "angled sheet form", the angle formed between the two portions is generally in the range from 120-170°). Since such trim strips are generally produced from metal in a bending process or in a general punching and shaping process, however, such a bend is not normally a really sharp edge, but instead a curvature.

Figure 3A:
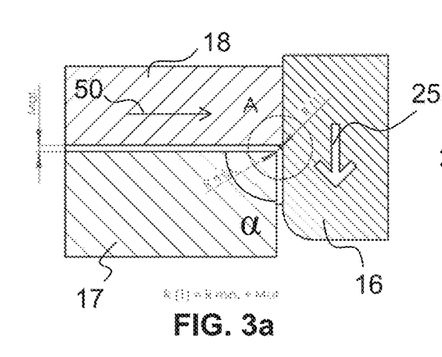
FIGS. 3a and 3b show in a) a conventional tool for folding over an edge portion and in b) an illustration of a turned-over region produced using such a tool.

Generally, the ends of the trim strips are currently closed using plastics material elements the ends of these trim snips are turned over, typically using a device, as illustrated in FIG. 3a, in order to achieve a termination. In this instance, at least the oral region of the extension portion 20 of the trim strip 11 is clamped between a die 17 for the bending operation and a holding-down member 18 for the bending operation. The region which is intended to be turned over protrudes beyond these two elements and is subsequently turned over by the stamp 16 for the bending operation which is displaced in the displacement direction 25 on the side edge of the elements 17 and 18. In this instance, an angle is produced between the main extent direction 50 of the trim strip and the extent direction of the turned-over region, as illustrated with α in the Figure.

Figure 3B:
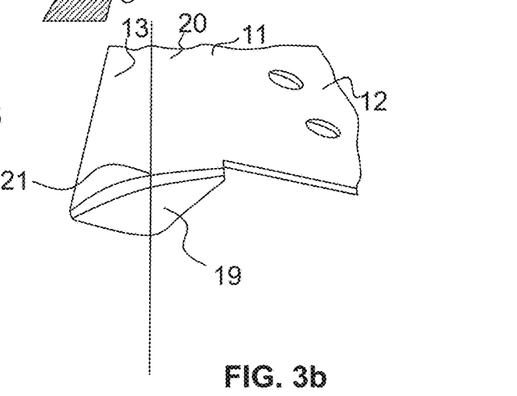

In this instance, there is produced a so-called bending radius (cf. FIG. 3b) in which a value cannot currently fall below a specific minimum size. This smallest possible outer radius R1 can be estimated at least approximately using the following formula:

$$R1 = Rmin + \text{material thickness} \quad (1)$$

Rmin: constant which is dependent, on the material and the material thickness.

This minimum size is itself limited by die material thickness used (typically 1.2 mm) and the material itself (typically aluminum) and is for the combination mentioned (1.2 mm aluminum) typically greater than 2.8 mm. Depending on the shape of the trim strip, it is generally the case that this radius after the bending operation is not constructed is a uniform manner (cf. also FIG. 3b).

Figure 4A:
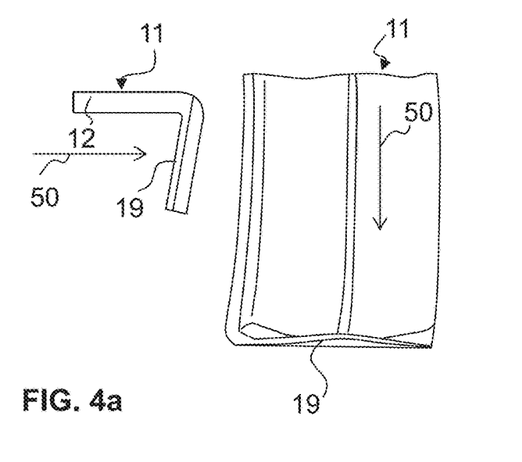
FIGS. 4a and 4b show in a) an edge portion turned-over using a conventional tool from below, which has been subsequently processed with a cutting operation, wherein at the top left a corresponding sectioned illustration is set out and shows in b) an edge portion turned over using a conventional tool which has been subsequently processed with a cutting operation.
Figure 4B:
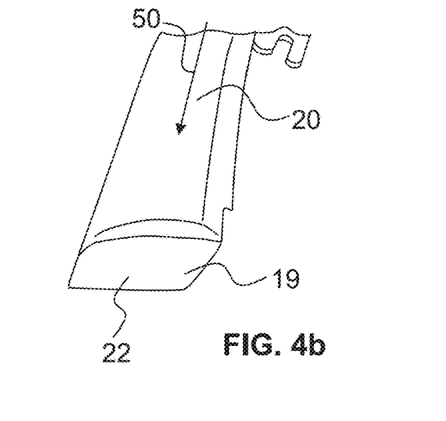

For design reasons and above all for technical reasons, however, trim strips are desired in which this radius is intended to be as small and uniform as possible. Currently, these requirements can partially be achieved by the ends of the trim strips being subsequently processed in a cutting operation. The result of such subsequent processing operations is illustrated in FIGS. 4a and 4b. However, this results in a reduction of the material thickness (cf. the sectioned illustration in FIG. 4a, top left in the insert). Furthermore, the radius is non-uniform (cf. the illustration in FIG. 4b) since the radius is only "capped" and is not actually reduced. This is not only aesthetically unsatisfactory but above all also technically inadequate since a surface which is not smooth enough can be produced over the entire vehicle and large gap dimensions result.

Figure 5:
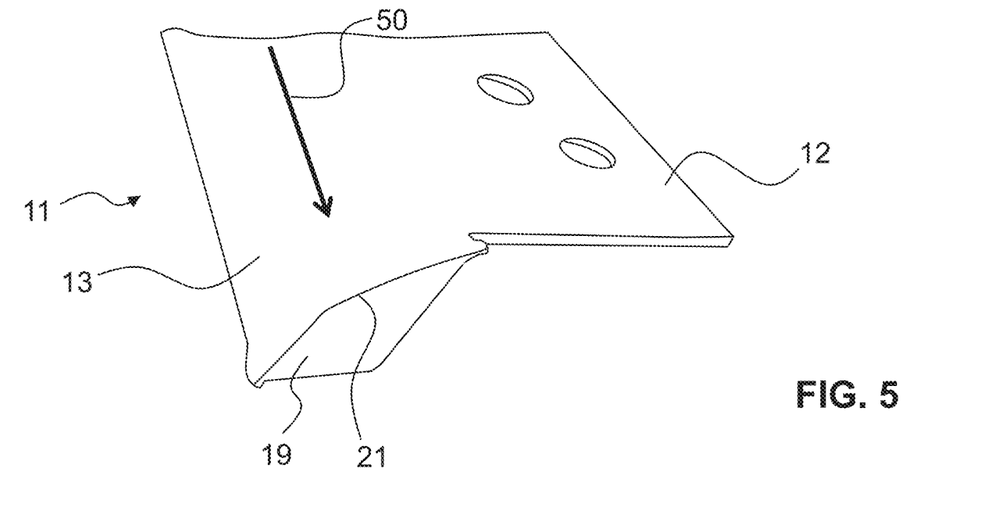
FIG. 5 shows a turned-over edge portion which has been produced in accordance with the method according to the invention from above.

The new method described in this instance enables the production of such trim strips with small and uniform radii (in particular between 0 mm and 2.0 mm) without the disadvantages of a subsequent cutting processing operation A component produced with the method proposed is illustrated in FIG. 5.

The method proposed has no influence on any subsequent steps of the surface processing operation (for example, polishing, anodization) as also used currently in existing production methods.

Figure 6A:
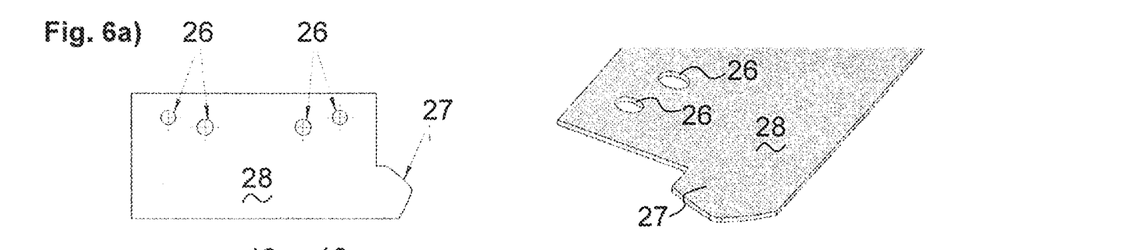

The proposed method is summarized in FIGS. 6a-6f in the individual steps: FIG. 6a shows the production of the plate 28 from a flat sheet metal strip by means of punching or another operation such as, for example, laser cutting. In this instance, there can be formed holes 26 which can be used in the following tool steps for positioning. Other types of positioning are also possible. The contour 27 in the region of the end of the trim strip ("end cap") can and is preferably already in this instance reserved, that is to say, the shape thereof does not correspond to the finished end cap, but is configured in such a manner that it is optimal for the "back-compression" (inter alia, with respect to material distribution and introduction of force). Alternatively, this contour 27 may also be introduced after the bending process, which where applicable may lead to a higher level of precision.

Figure 6B:
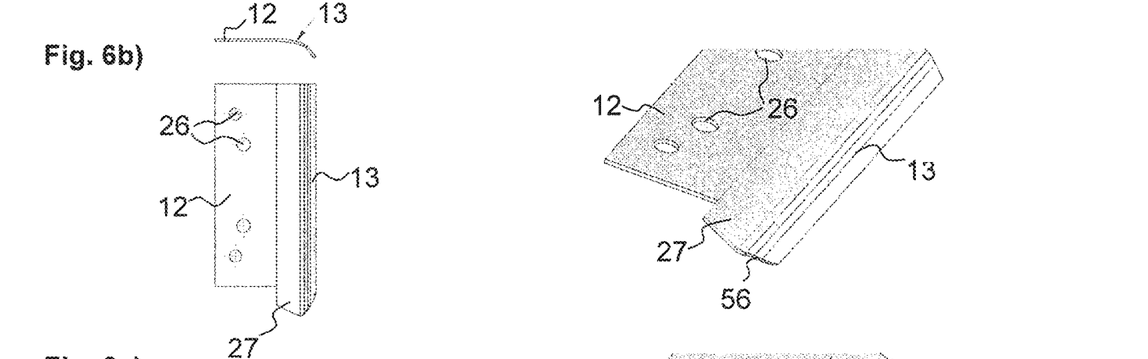

FIG. 6b shows the introduction of the roof bend in the longitudinal direction of the trim strip, alternatively the bend discussed above can also be introduced here, the step may, however, also be omitted if a planar trim strip is involved.

Figures 6C, 6D:
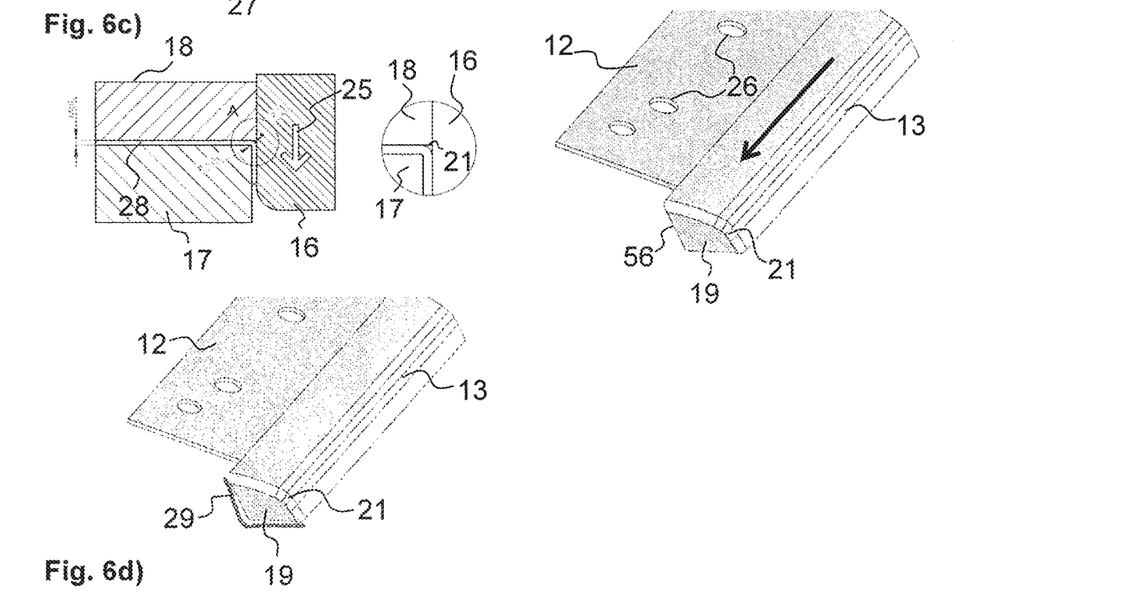

FIG. 6c shows the step of bending over the end 27 of the trim strip 11. An "end cap" is produced whose outer radius cannot be smaller than R1. In this instance, the trim strip which has already been curved from the step according to FIG. 6b is clamped in a tool between the dies 17 for the bending operation and the holding-down member 18 for the bending operation is clamped in such a manner that the reserved end cap contour 27 protrudes from the tool. The side edges of the elements 17 and 18 are offset by the material thickness of the plate so that the stamp 25 which is guided from above on the side edge of the holding-down member 18 turns over the region 27, wherein a rounded edge 21 is formed, as can be clearly seen in the enlargement in the circle in the center. At the end, there is produced the structure which is set out on the right in a perspective view which substantially corresponds to that illustrated in FIG. 3d and which has no sufficiently sharp edge 21.

Figure 6E:
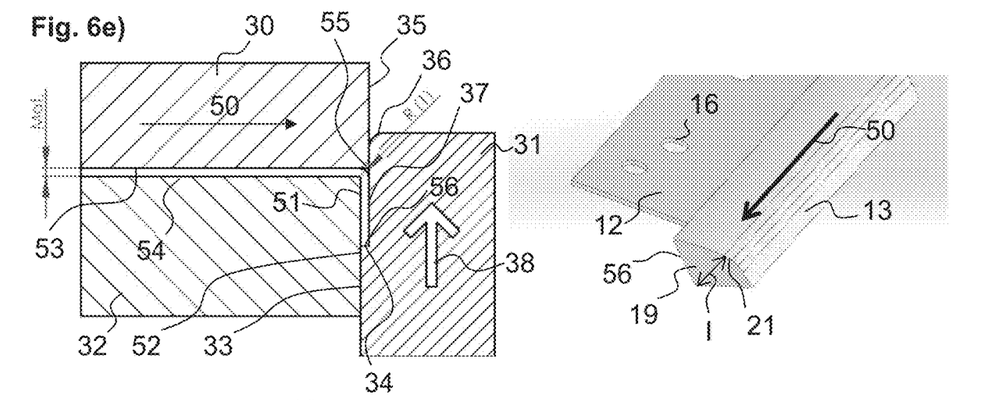

FIG. 6d shows another optional step, that is to say, after the step illustrated in FIG. 6c, after the bending, a cutting of the contour of the end cap along the schematically indicated line 29 can be carried out in order for the back-compression as illustrated in FIG. 6e to achieve an optimal contour.

As in FIG. 6e, the sharp edge is now produced in the decisive step by the turned-over region being compressed to some degree into a defined shape. Specifically, the end cap is compressed in order to obtain a small and uniform radius, using a tool as illustrated on the left. The trim strip is clamped between a die 30 for the edge formation operation and a counter-mold 32 for the edge formation operation, wherein in turn the side faces 35 and 53 are offset in such a manner that the end cap with the outer face thereof and the dies 30 with the side face thereof form a face. A stamp 31 is now supplied in the direction 38, wherein the stamp at the side face thereof facing the elements 30/32 has a step 34. The face 33 of the stamp 31 slides on the face 52 of the counter-mold 32 and the face 37 of the stamp 31 slides on the face 35 of the die 30. The turned-over portion is thus forced upward into the corner hollow space between the elements 30 and 31 and a sharp edge is thus formed. In this instance, in particular the stamp tor back-compression must have the corresponding contour. Alternatively, in a subsequent process step, the desired end contour can also be introduced by means of a corresponding separation operation (punching, lasering, etcetera).

In the figures set out in this instance, it is illustrated in each case how approximately a right angle (α equals 90°) is produced. However, if is also possible, for example, to form an acute angle, to this end the faces 33 and 35 in the illustration according in FIG. 6e have to be simply inclined slightly in a clockwise direction and the stamp 31 subsequently has to be guided along the corresponding contact face. Preferably, for the formation of an acute angle, during the turning-over operation illustrated in FIG. 6c, such an acute angle is already produced by the corresponding side faces also being inclined at that location.

Figure 6F:
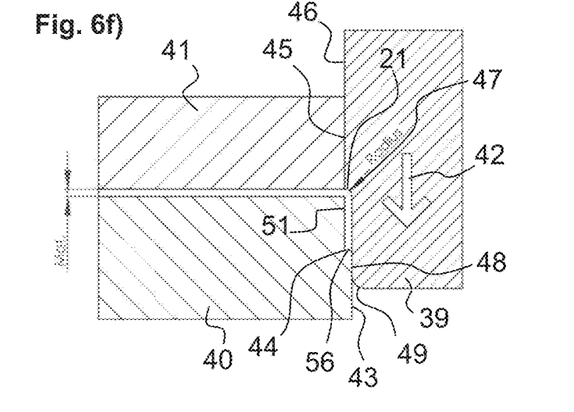
Figure 7:
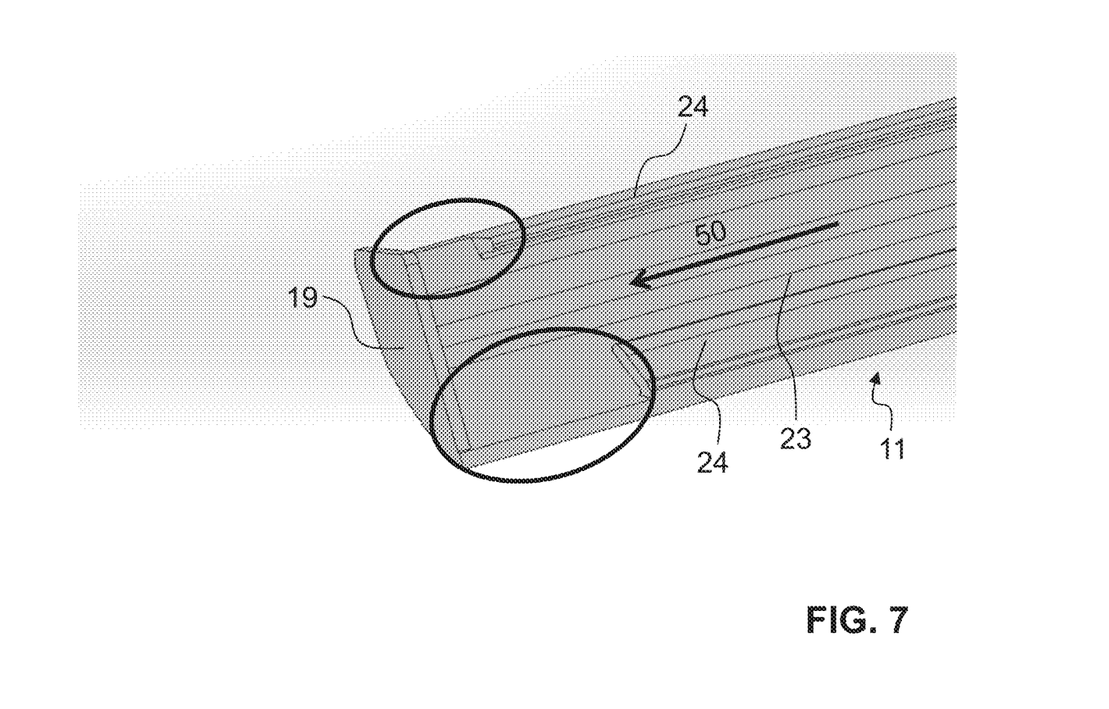
FIG. 7 is a perspective view of a trim strip produced starting from an extruded profile.

If desired, it is possible as illustrated in FIG. 6f after the back-compression to still stamp a radius on the end cap in order to construct the radius in a more uniform manner. For the production of the trim strips, depending on the required geometry, a sheet or also an extruded profile-section can be used as a semi-finished product, as illustrated in FIG. 7. For the production of the trim strips from an extruded profile, the stage sequence is intended to be modified, that is to say, where applicable, first predetermined regions (cf. circles in FIG. 7) are intended to be cut free. Subsequently, the production of the trim strip end is carried out in a similar manner to the process steps, as illustrated in FIGS. 6c to 6e. Using the method, these trim strips can be terminated both with an obtuse angle and with an acute angle.

LIST OF REFERENCE NUMERALS

| | |
|---|---|
| 1 | Automobile |
| 2 | Lower trim strip 11 on stationary region |
| 2' | Upper trim strip 11 on stationary region |
| 3 | Lower trim strip 11 on the rear door |
| 4 | Rear car door |
| 5 | Front car door |
| 6 | Lower trim strip 11 on the front door |
| 7 | Tailgate |
| 8 | Lower trim strip 11 on the tailgate |
| 9 | Glass pane |
| 10 | Bodywork substructure |
| 11 | Trim strip |
| 12 | planar portion of 11 |
| 13 | Bent-over portion of 11 |
| 14 | Folded portion of 11 |
| 15 | Fold location |
| 16 | Stamp for the bending operation |
| 17 | Die for the bending operation |
| 18 | Holding-down member for the bending operation |
| 19 | Turned-over region of 11 |
| 20 | Extension portion of 11 |
| 21 | Outer curvature |
| 22 | Milled region |
| 23 | Extruded profile |
| 24 | Edge profile rib of 23 |
| 25 | Displacement direction of 16 |
| 26 | Trimming guide pins |
| 27 | Reserved end cap contour |
| 28 | Cut blank after punching operation, plate |
| 29 | Contour cutting line |
| 30 | Die for edge formation operation |
| 31 | Stamp for edge formation operation |
| 32 | Counter-mold for edge formation operation |
| 33 | Contact face of 31 with 32 |
| 34 | Step in 31 |
| 35 | Side face of 30 |
| 36 | Rounded front corner of 31 |
| 37 | Contact face of 31 with 30 |
| 38 | Displacement direction of 31 |
| 39 | Stamp for radius embossing |
| 40 | Dies for radius embossing |
| 41 | Holding-down member for radius embossing |
| 42 | Displacement direction of 39 |
| 43 | Side face of 40 |
| 44 | Shoulder in 43 |
| 45 | Side face of 41 |
| 46 | Contact face of 39 with 45 |
| 47 | Rounded step for desired radius of 46 to 48 |
| 48 | Contact face of 39 with 40 |
| 49 | Rounded front corner of 39 |
| 50 | Main extent direction of 11 |
| 51 | Inner face of 19 |
| 52 | Side face of 32 |
| 53 | Clamping face of 30 |
| 54 | Clamping face of 32 |
| 55 | Overhanging region of 53 |
| 56 | Peripheral edge of 19 |

-continued

LIST OF REFERENCE NUMERALS

| | |
|---|---|
| L | Length of the trim strip |
| l | Maximum length of the turned-over portion 19 |
| Mat | Material thickness of starting material |
| Rmin | Minimum achievable radius at the inner side |
| R1 | Minimum achievable radius in the bending operation |
| α | Angle between 50 and 19 |

The invention claimed is:

1. A method for producing a trim strip which, in the extent direction thereof, has a length which is at least twice as large as the width thereof perpendicularly to said extent direction, has an extension portion and at least at one end a portion which is bent over with respect to the extent direction about an angle (a) in the range from 60–120° with a sharp edge comprising the following steps of:

i) presenting a plate with a material thickness and with a prepared contour for a formation of the extension portion of the trim strip;

ii) bending the prepared contour of the plate in a bending operation, during which bending operation the plate in the region of said extension portion, at least in an end region, is clamped between a die and a holding-down member and the prepared contour of the plate is bent over by means of a displacement of a stamp to form a bent-over portion with a peripheral edge;

iii) forming of said sharp edge of the bent-over portion of said plate to form said trim strip,
wherein at least in the end region of said extension portion a counter-mold is clamped between a first clamping face of the die and a second clamping face of the holding down member,
such that the inner face of said bent-over portion is in abutment with a planar or curved side face of said counter-mold, such that a corresponding side face of the die protrudes further in the extent direction substantially by the material thickness than the side face of the counter-mold, and
such that the first clamping face of the die is continued in an overhanging region by the material thickness in the extent direction, with a sharp edge of the die being formed with respect to the side face of the die, and iv) guiding a stamp with a side face which is stepped substantially by the material thickness and which faces the die and counter-mold in such a manner along the side faces of the counter-mold and die that the step in the side face of the stamp engages on said peripheral edge and displaces the material of the bent-over portion at least partially in the edge region with said sharp edge being formed.

2. The method as claimed in claim 1, wherein the peripheral edge is cut between step ii) and step iii) in at least one of a punching operation or a cutting operation or is processed in a machining manner.

3. The method as claimed in claim 1, wherein in step i) said plate with a material thickness and with a reserved end cap contour is presented or wherein after step iii) in at least one of a punching operation or a cutting operation or a chip removal operation the end cap contour is produced.

4. The method as claimed in claim 1, wherein the plate which is presented in step i) is produced in at least one of a punching operation or cutting operation, including laser cutting, from a flat sheet metal strip.

5. The method as claimed in claim 4, wherein before step i) the plate is folded or curved about an axis which extends substantially parallel with the extent direction forming a bent-over portion or a folded portion.

6. The method as claimed in claim 1, wherein the plate presented in step i) is produced from an extruded profile.

7. The method as claimed in claim 1, wherein in step ii) the bent-over portion is bent about an axis perpendicular to the extent direction.

8. The method as claimed in claim 1, wherein, following step iii), the trim strip is subjected to another processing step including at least one of cutting, surface treatment, including surface coating, polishing, anodization, honing, chip removal surface treatment.

9. The method as claimed in claim 1, wherein, following step iii), the sharp edge of the trim strip is further refined in a subsequent embossing step by the extension portion of the trim strip at least in the end region being clamped between a first clamping face of a die for the radius embossing and a second clamping face of a holding-down member for the radius embossing, the peripheral edge of the turned-over portion is supported in a step of a side face of the die for the radius embossing and from the side of the holding-down member a stamp for the radius embossing with a rounded step for the desired radius for the sharp edge is guided in a shaping manner on the sharp edge.

10. The method as claimed in claim 1, wherein the trim strip consists of metal.

11. The method as claimed in claim 1, wherein the plate has a material thickness in the range from 0.5-2.5 mm.

12. The method as claimed in claim 1,
wherein the sharp edge has a radius of at most 2.0 mm, or
wherein the plate has a material thickness and the sharp edge has a radius of 0.1-0.4 times the material thickness.

13. The method as claimed in claim 1,
wherein the length is in the range from 5-300 cm or the width is in the range from 0.4-12 cm, or
wherein the length of the turned-over portion at the longest location is in the range from 0.3-5 cm.

14. The method as claimed in claim 1,
wherein the plate which is presented in step i) is produced by a process selected from the group consisting of a punching operation or a cutting operation, including laser cutting, from a flat sheet metal strip,
wherein holes are provided in said process.

15. The method as claimed in claim 1,
wherein the plate presented in step i) has been produced from an extruded profile, and
wherein any edge profile ribs which may be present in a region adjacent to the turned-over portion are cut out in advance.

16. The method as claimed in claim 11, wherein the material of the trim strip is selected from the group consisting of aluminum an aluminum alloy, steel, stainless steel, brass, silver, titanium, copper, or an alloy of these materials.

17. The method as claimed in claim 1, wherein the plate has a material thickness in the range from 0.8-2 mm.

18. The method as claimed in claim 1, wherein the plate has a material thickness in the range from 1-1.6 mm.

19. The method as claimed in claim 1,
wherein the sharp edge has a radius in the range from 0.1-2.0 mm, or
wherein the plate has a material thickness, in the range from 0.5-2.5 mm and the sharp edge has a radius of 0.2-0.3 times the material thickness.

20. The method as claimed in claim 1,
wherein the sharp edge has a radius in the range from 0.2-1 mm, or
wherein the plate has a material thickness in the range from 1-1.6 mm, and the sharp edge has a radius of 0.2-0.3 times the material thickness.

21. The method as claimed in claim 1,
wherein the length is in the range from 10-150 cm, or the width is in the range from 1-5 cm, or
wherein the length of the turned-over portion at the longest location is in the range from 0.5-3 cm.

22. The method as claimed in claim 1,
wherein the length is in the range from 20-100 cm, or the width is in the range from 1-3 cm, or
wherein the length of the turned-over portion at the longest location is in the range from 0.5-3 cm.

* * * * *